United States Patent [19]

Nagata et al.

[11] Patent Number: 5,765,865
[45] Date of Patent: Jun. 16, 1998

[54] MOUNTING STRUCTURE FOR STEERING WHEEL

[75] Inventors: Atsushi Nagata, Inazawa; Akio Hosoi, Komaki; Tooru Koyama, Aichi-ken, all of Japan

[73] Assignee: Toyoda Gosei Co., Ltd., Aichi-ken, Japan

[21] Appl. No.: 708,587

[22] Filed: Sep. 5, 1996

[30] Foreign Application Priority Data

| Sep. 6, 1995 | [JP] | Japan | 7-229478 |
| Sep. 6, 1995 | [JP] | Japan | 7-229479 |
| Sep. 6, 1995 | [JP] | Japan | 7-229480 |
| Sep. 6, 1995 | [JP] | Japan | 7-229481 |

[51] Int. Cl.⁶ .................................................. B60R 21/16
[52] U.S. Cl. ............................... 280/731; 280/728.2
[58] Field of Search ........................... 280/731, 728.2, 280/728.1; 74/552

[56] References Cited

U.S. PATENT DOCUMENTS

| 5,267,486 | 12/1993 | Niwa et al. | 280/731 X |
| 5,286,055 | 2/1994 | Zashi | 280/728.2 |
| 5,470,099 | 11/1995 | Williams | 280/728.2 |
| 5,562,301 | 10/1996 | Lutz | 280/728.2 |
| 5,584,501 | 12/1996 | Walters | 280/728.2 |
| 5,584,503 | 12/1996 | Lutz | 280/731 |

FOREIGN PATENT DOCUMENTS

| 63-134368 | 6/1988 | Japan . |
| 2-24691 | 7/1990 | Japan . |
| 2-133955 | 11/1990 | Japan . |
| 62-64383 | 1/1993 | Japan . |

*Primary Examiner*—Christopher P. Ellis
*Attorney, Agent, or Firm*—Cushman Darby & Cushman, IP Group of Madison & Sutro LLP

[57] ABSTRACT

A steering wheel body includes a ring core, a plurality of spoke cores extending from the ring core, a surface layer that covers the ring core and the spoke cores, and a pad which is located at the center of the ring core and formed continuously from the surface layer. A mounting member attached to the wheel body is constituted by either an insert embedded in the insert, an air bag mechanism accommodated in the insert, or a boss plate connecting the wheel body to a steering shaft. Adjacent spoke cores are connected to each other by connectors. The mounting member is attached to the connectors.

17 Claims, 18 Drawing Sheets

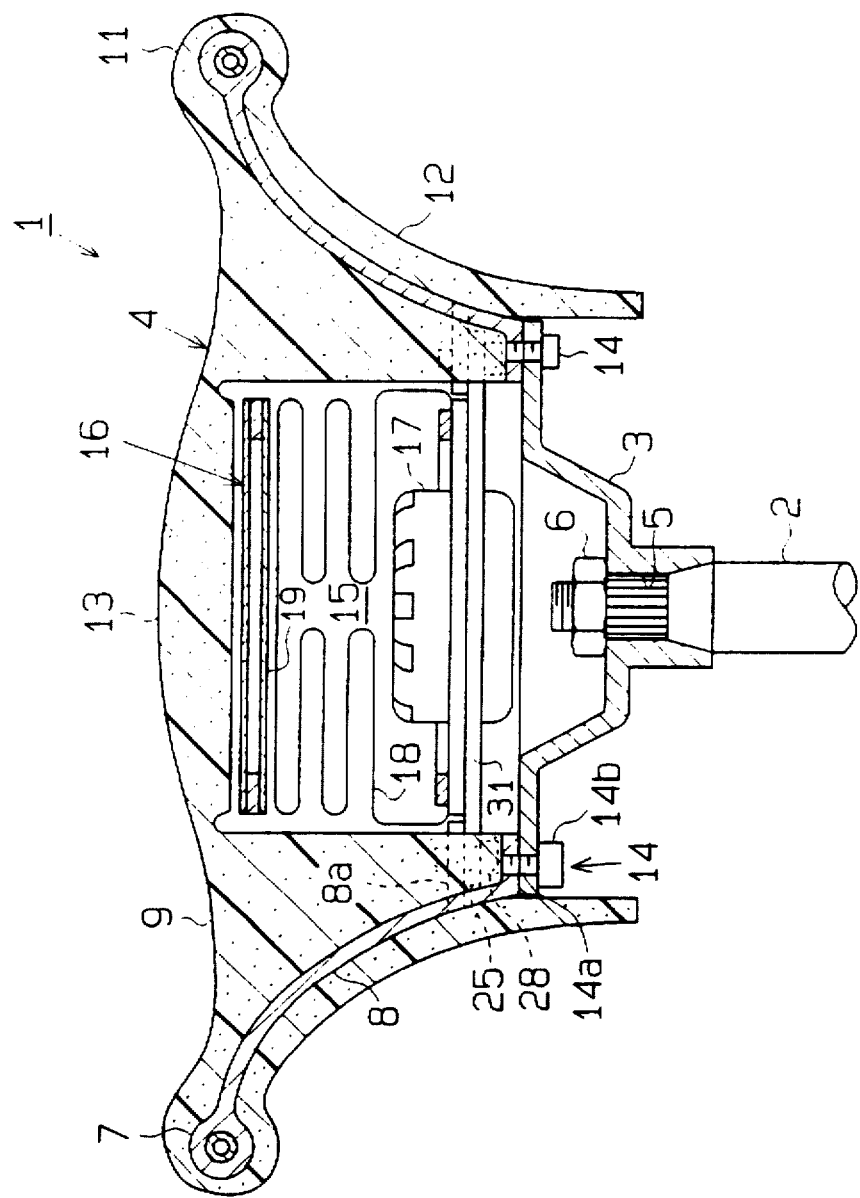

MOUNTING STRUCTURE FOR STEERING WHEEL

BACKGROUND OF THE INVENTION

1. Field of the Invention

The present invention relates to steering wheels for vehicles, and more particularly to a mounting structure for a steering wheel having a resin surface layer, which covers spokes, and a pad section which is formed integrally with the surface layer.

2. Description of the Related Art

A typical steering wheel includes a gripping ring and a pad. The pad is located at the center of the ring and connected to the ring by spokes. The ring, spokes, and pad are entirely covered by a resin surface layer. The surface layer is formed continuously between the pad and the ring. This eliminates lines which would be defined if the pad and the ring were covered by separate surface layers. Thus, the continuous surface layer provides an improved appearance of the steering wheel. The continuous surface layer also reduces molding steps and thus simplifies production of the wheel. This leads to a decrease in the manufacturing costs.

Japanese Unexamined Patent Publication No. 2-133955 discloses such a steering wheel. As shown in FIG. 19, the steering wheel has a boss plate 152 mounted on a steering shaft 151. An air bag mechanism 178 is provided above the center section of the boss plate 152. The mechanism 178 includes an inflator 153, an air bag 154, and a bag holder 180. The inflator 153 and the air bag 154 are held firmly on the bag holder 180. A steering wheel body 155 is mounted on the boss plate 152 in a manner that encompasses the air bag mechanism 178.

The steering wheel body 155 includes a metal ring core 156, metal spoke cores 157 which extend from the ring core 156 toward the center of the body 155, a surface layer 158, and a pad 159. The surface layer 158 is made of polyurethane or the like and cover the ring core 156 and the spoke cores 157. The pad 158 is also made of polyurethane and located at the center section of the wheel body 155 above the air bag mechanism 178. The pad 158 is formed continuously from the surface layer 158 and thus improves the appearance of the steering wheel. This reduces costs and simplifies production.

A box-like insert 163, made of synthetic resin, is embedded in the surface layer 158 and the pad 159. The insert 163 includes a frame 164 and a mesh portion 165 which is connected to the frame 164 by a hinge section.

Impacts applied to the vehicle are detected by a sensor. When the force of an impact exceeds a predetermined level, the sensor transmits a signal and inflates the air bag 154 with the gas produced by the inflator 153. The inflated air bag 154 projects outwardly from the pad 159. The insert 163 reinforces the surface layer 158 and the pad 158 and prevents pieces of the layer 158 and the pad 159 from being dispersed during the inflation of the air bag 154.

However, as shown in FIG. 20, holes 161 are formed in the boss plate 152 and aligned with a hole 162 provided in each spoke cores 157 to secure the plate 152 to the cores 157 with a fastener such as a bolt 170. When there are four spokes (spoke core 157), each of the four spoke cores 157 must be fixed to the boss plate 152 to ensure stable mounting. Thus, the number of holes 161, 162, and bolts 170 must correspond to the number of the spoke cores 157. Accordingly, this causes the assembling of the wheel body 155 to the boss plate 152 to be burdensome and thus results in a degradation in workability. This also increases the number of necessary parts, such as the bolts 170, and increases costs.

Furthermore, the boss plate 152 and the spoke cores 157 are both made of a metal material. The boss plate 152 and the wheel body 155 are fastened to each other with the plate 152 directly contacting the spoke cores 157. Hence, the vibration from the engine may be transmitted to the ring core 156 by way of the steering shaft 151, the boss plate 152, and the spoke cores 157. This degrades the maneuverability of the steering wheel.

The bag holder 180 is fixed to the surface layer 158. The surface layer 158 is usually made of a synthetic resin. Thus, strong impacts may cause instantaneous deformation of the surface layer 158 regardless of the layer 158 being made of a material having superior hardness. Hence, it is difficult to keep the bag holder 180 securely retained when the force of the gas produced by the inflator 153 is transmitted to the holder 180 by way of the inflator 153 and the air bag 154.

Additionally, the insert 163 is merely provided in the surface layer 158 and the pad 158. Thus, the retaining strength with respect to the insert is 163 insufficient and may thus slightly displace the insert 163 during inflation of the air bag 154. Accordingly, there is a demand for an improvement in the retaining mechanism of the insert 153.

SUMMARY OF THE INVENTION

Accordingly, it is a primary object of the present invention to provide a steering wheel that improves workability during mounting of the wheel and thus decreases costs.

Another object of the present invention is to provide a steering wheel that enables high maneuverability.

It is also an object of the present invention to provide a steering wheel capable of securely retaining a bag holder that accommodates an air bag mechanism.

A further object of the present invention is to provide a steering wheel having an insert which is securely fixed in the wheel.

To achieve the above objects, a steering wheel includes a wheel body having a ring, a pad located in a center section of the ring, and spokes coupling the ring and the pad. The ring and each of the spokes, respectively, have cores covered by a surface layer which extends continuously to a surface of the pad. The steering wheel has a mounting assembly and a connection portion. The mounting assembly includes either an insert embedded in the pad, an air bag mechanism, or a boss plate connecting the wheel body with the steering shaft. The connection portion connects the adjacent spoke cores to each other. The mounting assembly is attached to the connection portion.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which;

FIG. 6 is a cross-sectional view showing the mounting structure of a steering wheel assembly according to a second embodiment of the present invention;

DETAILED DESCRIPTION OF THE PREFERRED EMBODIMENTS

A first embodiment of the present invention will hereafter be described with reference to FIGS. 1 to 4.

Figure 1:
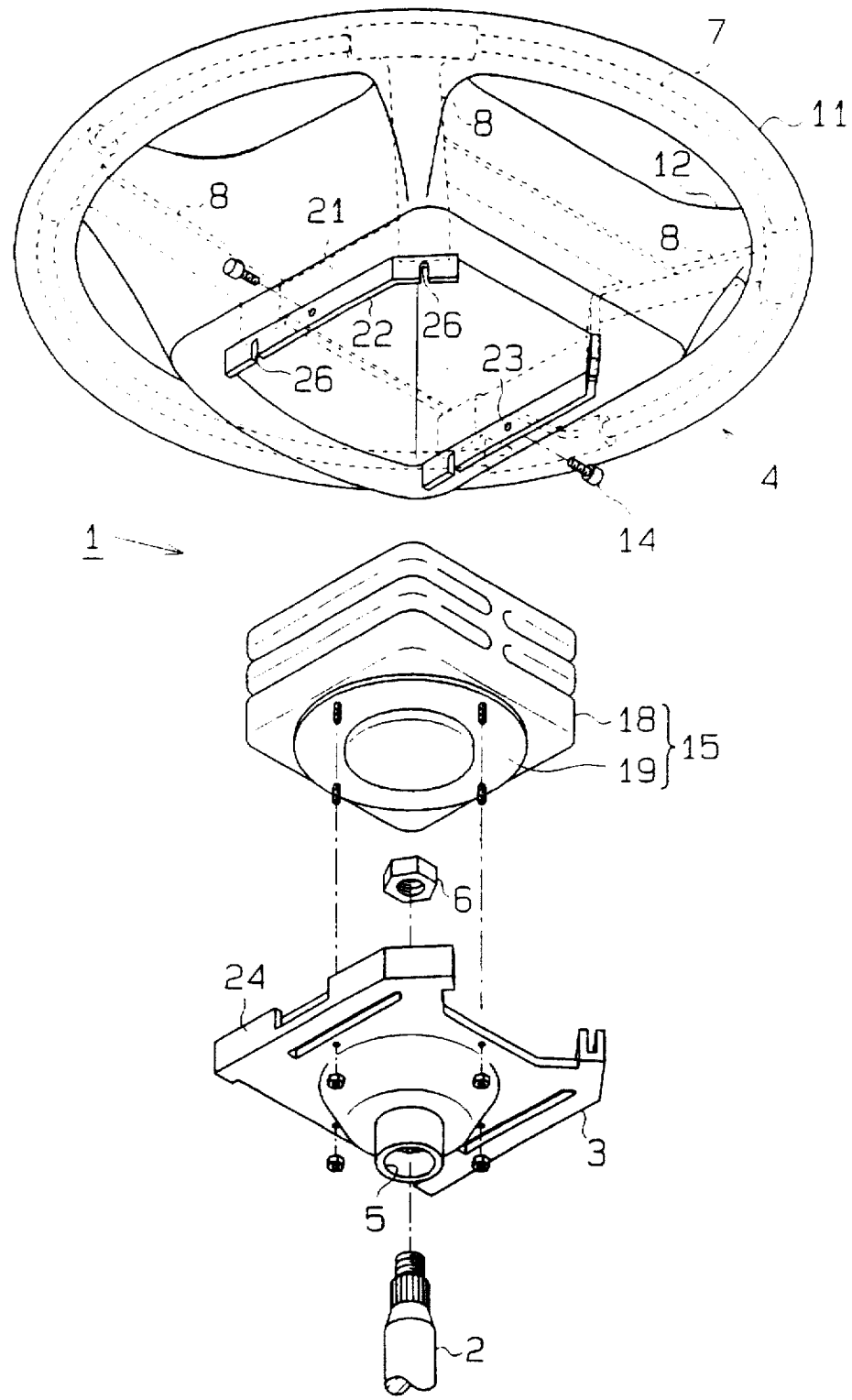
FIG. 1 is an exploded perspective view showing a steering wheel assembly according to a first embodiment of the present invention from below.
Figure 2:
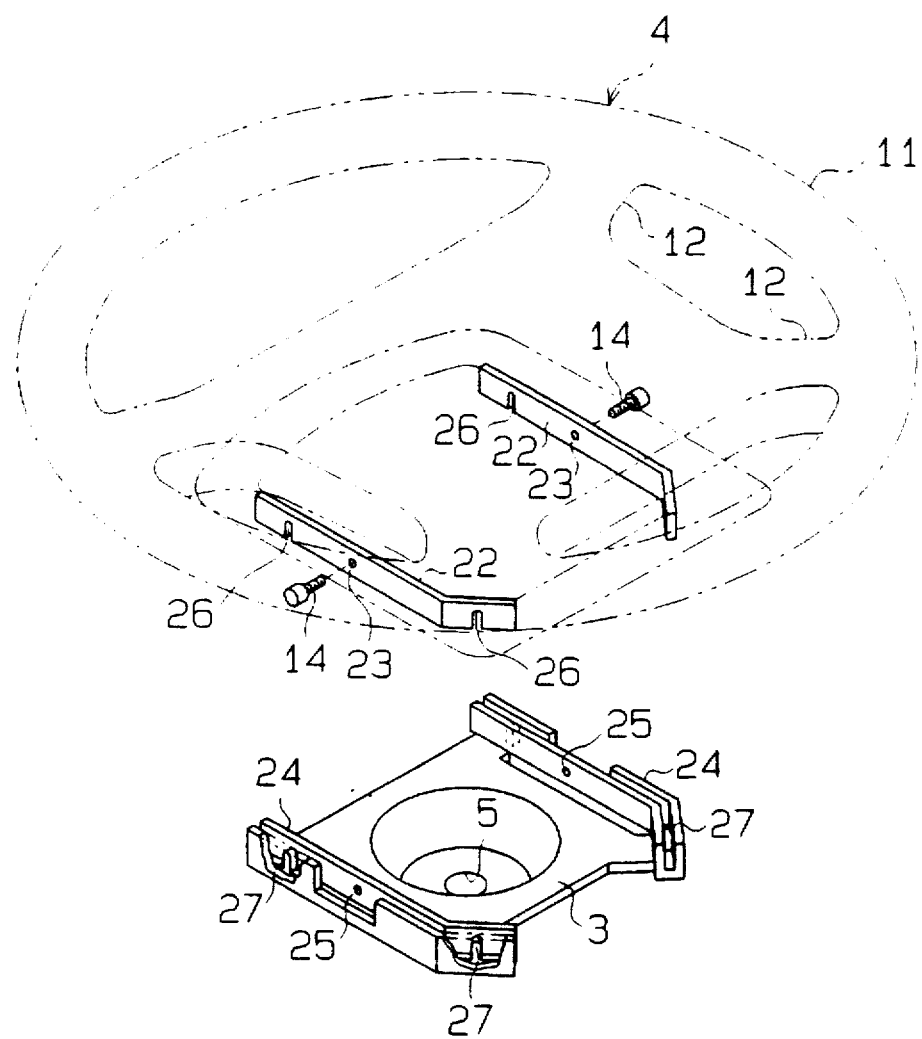
FIG. 2 is an exploded perspective view showing a portion of the steering wheel assembly of FIG. 1 from above.
Figure 3:
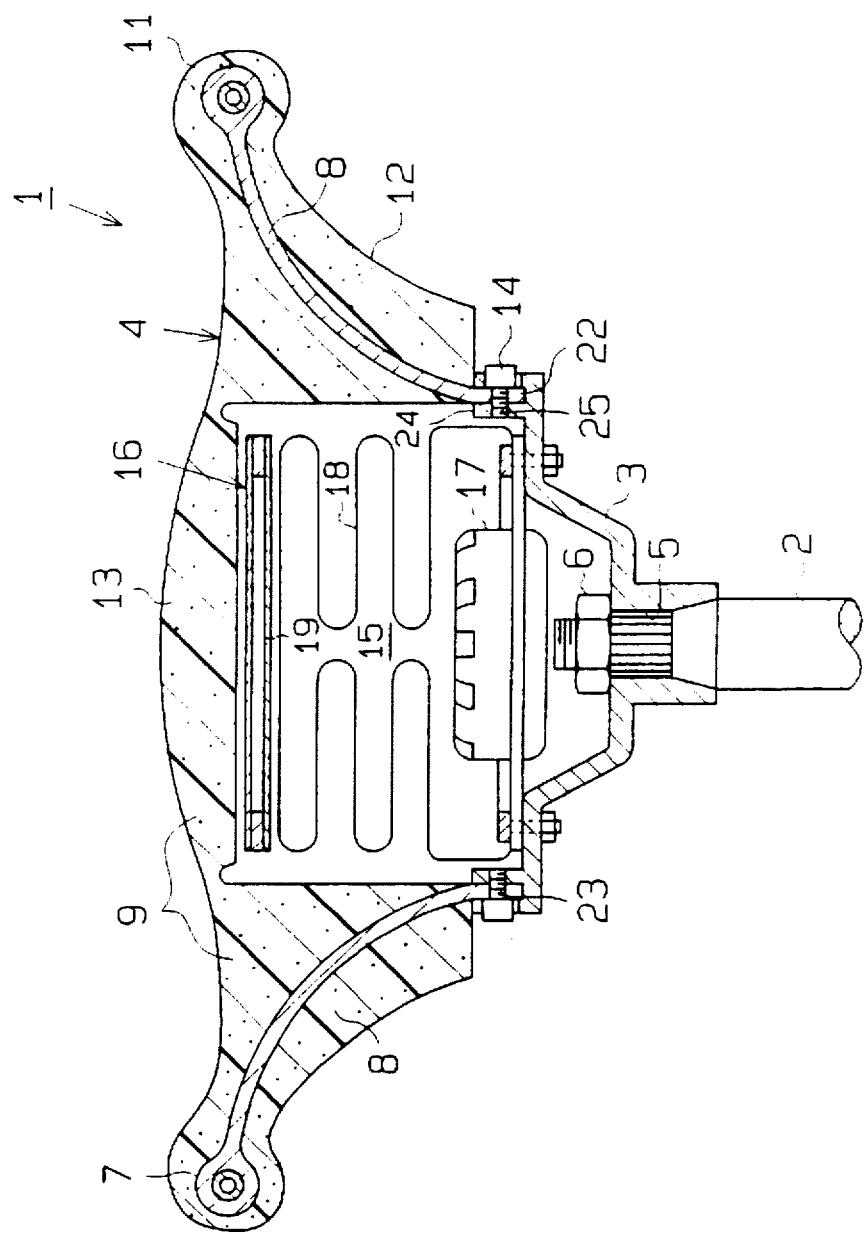
FIG. 3 is a cross-sectional view showing the structure of the steering wheel assembly.
Figure 4:
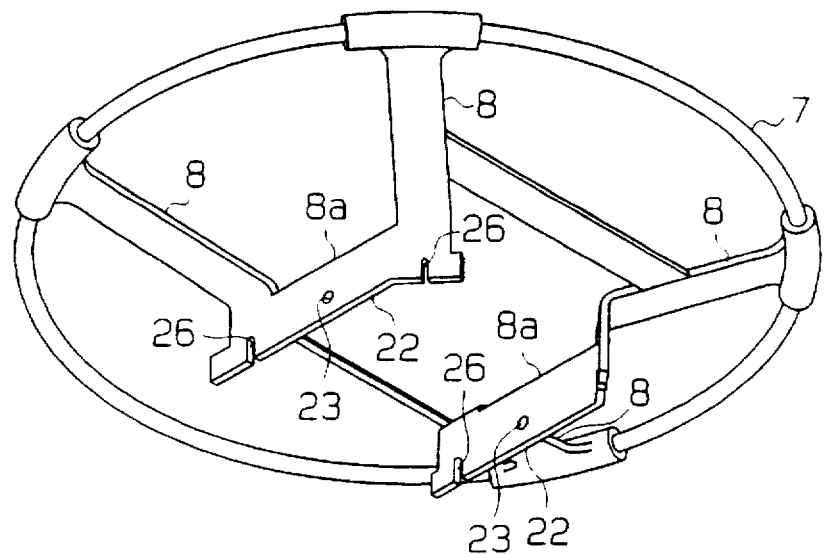
FIG. 4 is a perspective view showing the cores of the steering wheel.

As shown in FIG. 3, a steering wheel 1 is mounted on the distal end of a steering shaft 2 and is rotatable about the axis of the shaft 2. The steering wheel 1 includes a metal boss plate 3, a steering wheel body 4, and a lower cover (not shown). The lower cover is attached to the lower periphery of the wheel body 4 and the boss plate 3.

More specifically, the distal end of the steering shaft 2 is provided with serrations. An inserting hole 5, the wall of which is provided with serrations corresponding to the serrations of the shaft 2, is provided at the center section of the boss plate 3. The boss plate 3 is mounted on the steering shaft 2 by fitting the distal end of the shaft 2 into the hole 5. A nut 6 is fastened to the distal end of the shaft 2, which projects upward from the boss plate 3, to enable integral rotation of the boss plate 3 and the shaft 2.

The wheel body 4 includes an annular ring core 7 made of die-cast aluminum, a plurality of spoke cores 8 (four in this embodiment) extend from the ring core 7 toward the center of the core 7, and a polyurethane surface layer 9 covers the ring core 7 and the spoke cores 8. A gripping ring 11 is constituted by the ring core 7 and the surface layer 9.

Spokes 12, which transmit the rotation of the ring 11 to the boss plate 3, are constituted by the spoke cores 8 and the surface layer 9. Brackets 24 project upwardly from the boss plate 3. Each bracket 24 opposes one of the ribs 22 and is located at a position slightly outwardly from the rib 22. Each bracket 24 has a hole 25 which corresponds with the associated threaded hole 23.

Engaging notches 26 are provided in each rib 22. Each bracket 24 is provided with projections 27 that engage the notches 26. The holes 23 and 25 are aligned to each other when the walls of each rib 22 abuts against each associated bracket 24 with the notches 26 engaging the projections 27. In this state, a bolt 14 is inserted into each aligned pair of aligned holes 23, 25 to fasten the wheel body 1 to the boss plate 3.

In the above manner, the connectors 8a are provided between the spoke cores 8, and the rib 22 of each connector 8a is utilized by the bolt 14 for fastening. Thus, as apparent from the drawings, it is possible to securely support all four spoke cores 8 in a stable state by fastening only two sections, the number of which corresponds to the number of the ribs 22. This ensures a stable mounting state and improves workability when assembling the wheel body 1. In addition, this structure reduces the number of bolts 14, that is, the number of required parts in comparison with the prior art structure, and thus allows a reduction in costs.

It is required that the wheel body 4 be aligned by the boss plate 3 during assembly. In this embodiment, such alignment is accomplished simply by engaging the notch 26 with the projection 27. This improves workability when assembling the steering wheel.

Furthermore, the walls of the rib 22 and the associates bracket 24 are abutted against each other. This increases the contact area between the boss plate 3 and the wheel body 4 and further stabilizes the mounting state of the body 4 with respect to the plate 3. A portion of each rib 22 and the associates portion of bracket 24 are bent at an obtuse angle. This prevent displacement of the spoke cores 8 with respect to the boss plate 3 in the state which the cores 8 are abutted against the plate 3. Accordingly, the mounting state of the wheel body 4 with respect to the boss plate 3 is further stabilized.

Figure 5A:
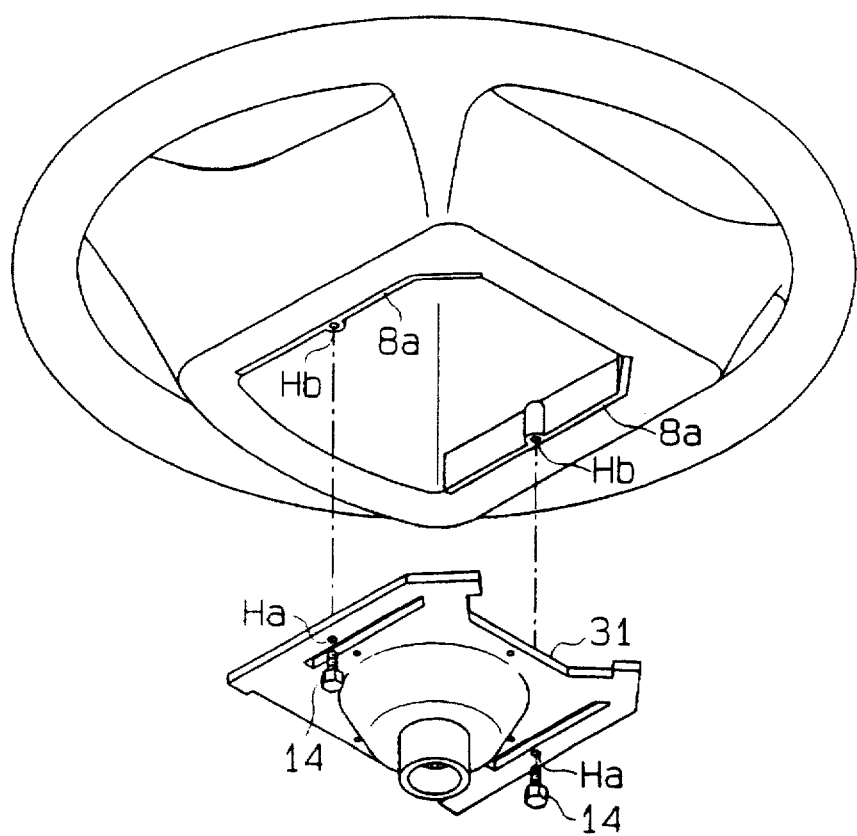
FIG. 5(A) is an exploded perspective view showing a modification of the first embodiment.

The ribs 22 of the connectors 8a and the brackets 24 of the boss plate 3 may be substituted by the structure shown in FIG. 5(A). In this case, the boss plate 3 is abutted against the connectors 8a of the spoke cores 8 with bolt holes Ha of the boss plate 31 aligned with associated threaded holes Hb of the connectors 8a. Bolts 14 are then screwed into the aligned pair of holes Ha, Hb for fastening.

Figure 5B:
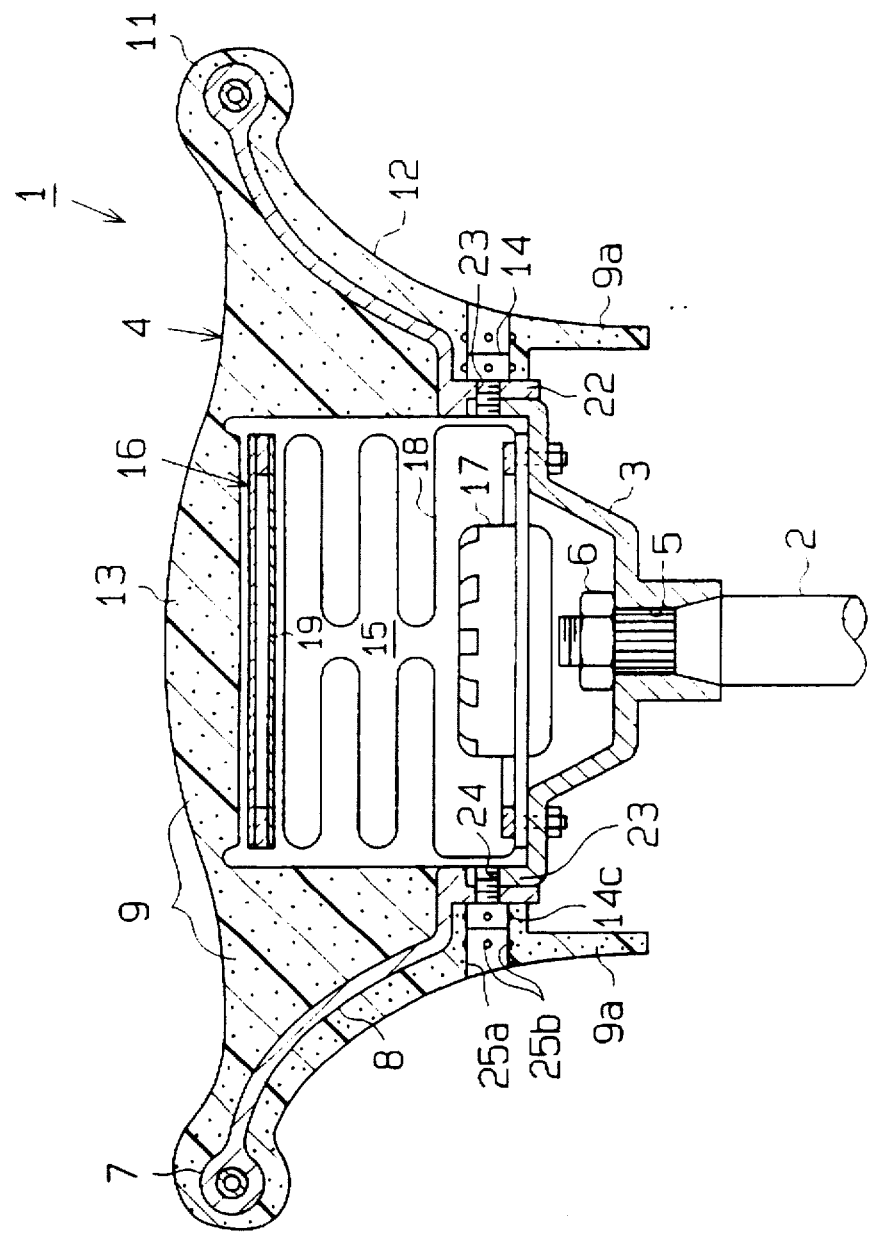
FIG. 5(B) is a cross-sectional view showing another modification of the first embodiment.

FIG. 5(B) illustrates a modification of the first embodiment. An extended portion 9a, defined in the lower section of the surface layer 9, projects downwardly. Inserting holes 25a, having a diameter that is the same as the outer diameter of the head of the bolt 14, are provided in the extended portion 9a at sections corresponding to the bolt holes 25 of the ribs 22. A plurality of engaging recesses 25b are provided in the wall of each inserting hole 25b. Projections 14c, which correspond to the engaging recesses 25b, are formed on each bolt 14.

To secure the wheel body 4 to the boss plate 3, the bolt 14 is first inserted into the inserting hole 25a. As the bolt 14 advances inwardly, the head of the bolt 14 slides against the wall of the hole 25a until the projections 14c fit into the recesses 25b. At this stage, the bolt hole 25a is then aligned with the associated threaded hole 24. Afterwards, the bolt 14 is screwed into the threaded hole 24. The tentative securing the bolt 14 prevents the bolt 14 from falling out of the wheel body 4 even if the bolt 14 is temporarily not supported. This greatly improves workability.

A second embodiment according to the present invention will hereafter be described with references to FIGS. 6 to 10.

The air bag mechanism 15 is located below the horn switch mechanism 16 and between the boss plate 3 and the pad 13. The air bag mechanism 15 includes an inflator 17, the air bat 18, and an annular plate-like bag holder 31. The peripheral section of the air bag 18 and the inflator 17 are fixed to the bag holder 31 by bolts (not shown).

Figure 8:
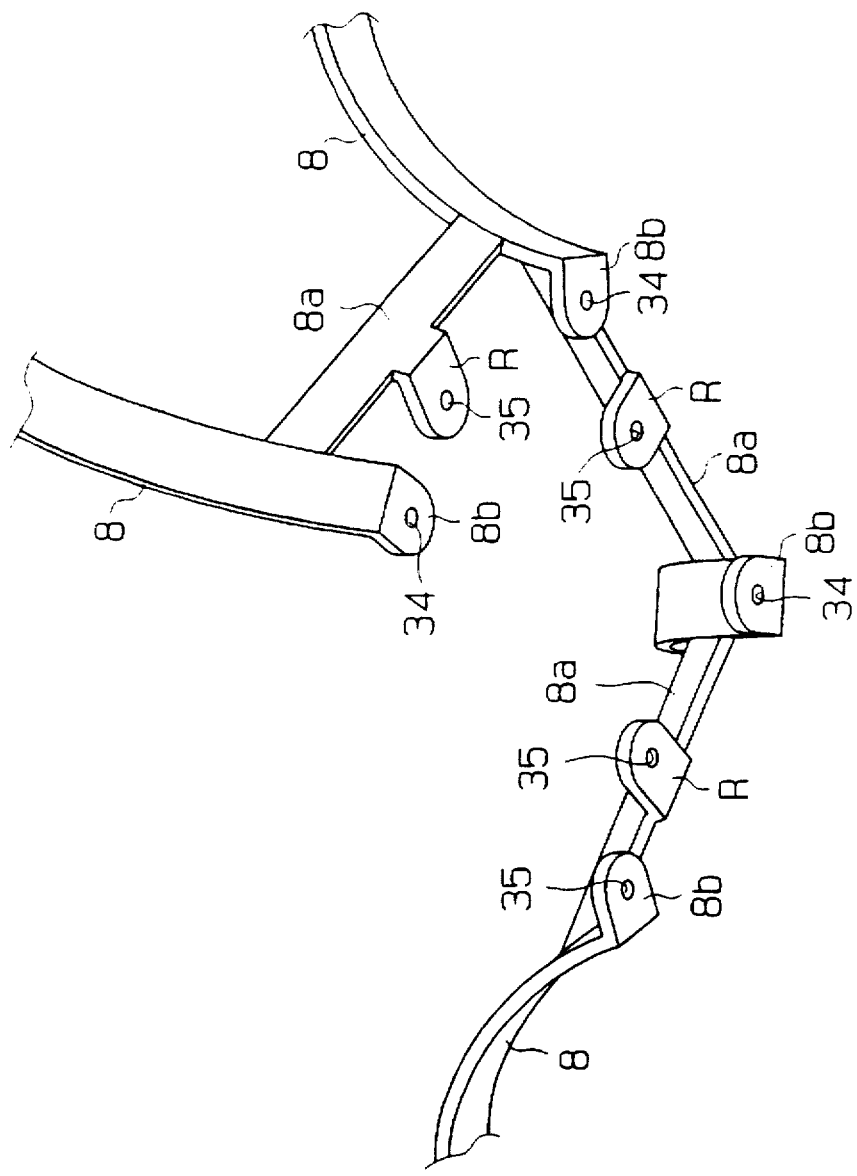
FIG. 8 is a partial perspective view showing spoke cores.

As shown in FIG. 8, support plates 8b are bent inwardly from the lower end of each spoke core 8. A threaded hole 34 extends through the center section of each support plate 8b. The connectors 8a connect the distal end of adjacent spoke cores 8. A tongue-like receiving plate R projects inwardly from the longitudinally middle section of each connector 8a. A threaded hole 35 is formed at the center section of each receiving plate R.

Figure 7:
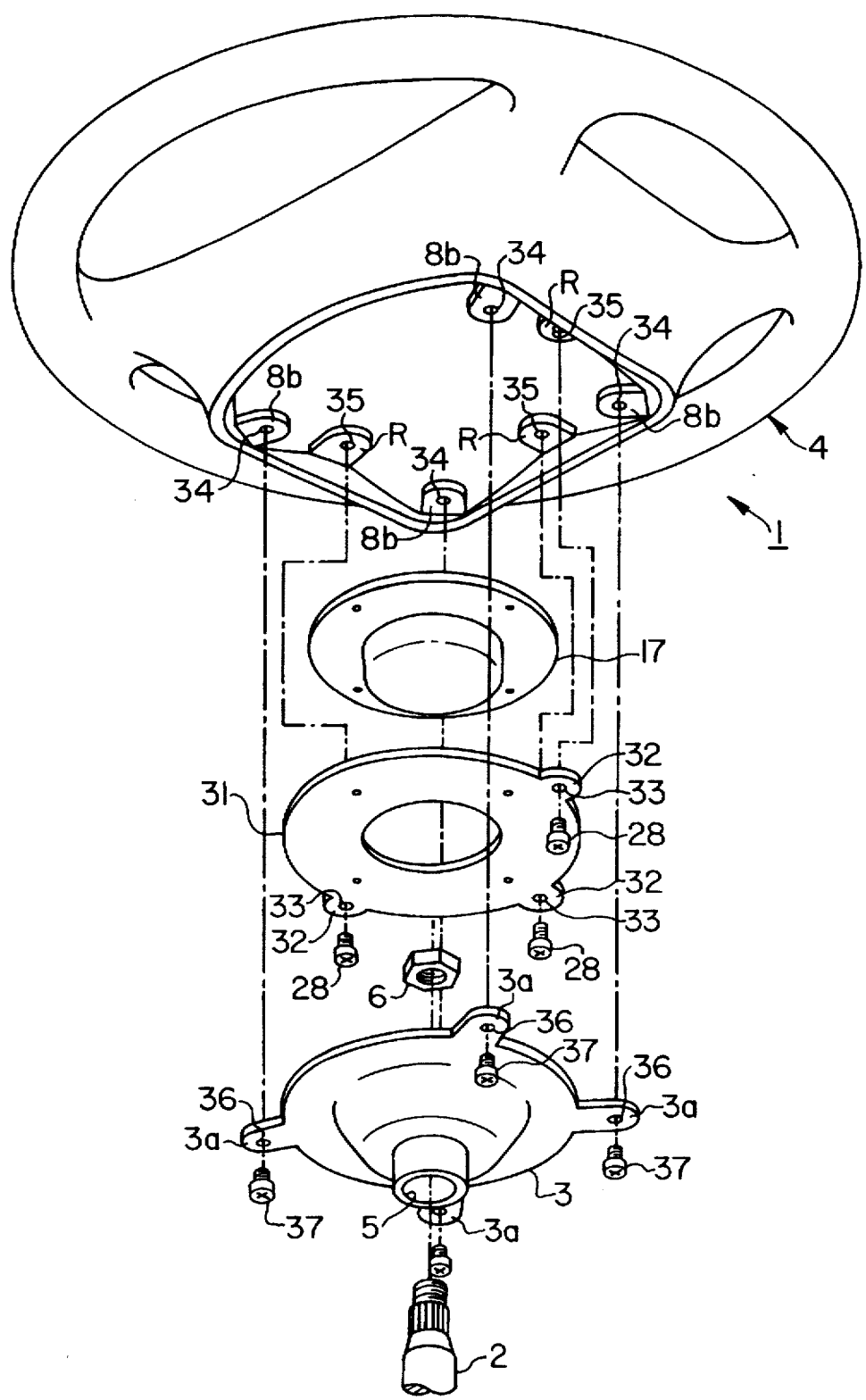
FIG. 7 is an exploded perspective view showing the steering wheel assembly from below.

As shown in FIG. 7, three projections 32 extend outwardly from the periphery of the bag holder 31. A bolt hole 33, that corresponds with one of the threaded holes 35, is provided in each projection 32. Each bolt hole 33 is aligned with the associated threaded hole 5. A bolt 28 is then inserted into the aligned holes 33, 35 to fasten the bag holder 31 to the spoke cores 8.

Four projections 3a extend from the periphery of the boss plate 3. A bolt hole 36 that corresponds with the threaded hole 34 of one of the spoke cores 8 is provided at the center section of each projection 3a. Each bolt hole 36 is aligned with the associated threaded hole 34. A bolt 37 is then inserted into the aligned holes 34, 36 to fasten the boss plate 3 and the wheel body 4 to each other.

When an impact having a predetermined level of force is applied to the vehicle, gas is produced instantaneously by the inflator 17. This inflates and projects the air bag 18 from the steering wheel 1. The bag holder 31 is fixed to the metal spoke cores 8. Therefore, the bag holder 31 remains stationary regardless of the stress applied to the holder 31 by the inflation of the air bag 18. Accordingly, the air bag 18 and the inflator 17 are retained in a stable state. As a result, this structure prevents problems caused by displacement of the bag holder 31. It also ensures stable inflation of the air bag 18.

The bag holder 31 is fixed to the connectors 8a of the spoke cores 8. Thus, a stable retaining force is ensured even though the number of fastening sections (three in this embodiment) are less than the number of spokes 12 (four in this embodiment). This improves workability during assembly and reduces costs.

The connectors 8a of the spoke cores 8 may be omitted in this embodiment. In this case, the bag holder 31 may be attached directly to the spoke cores 8.

Figure 9:
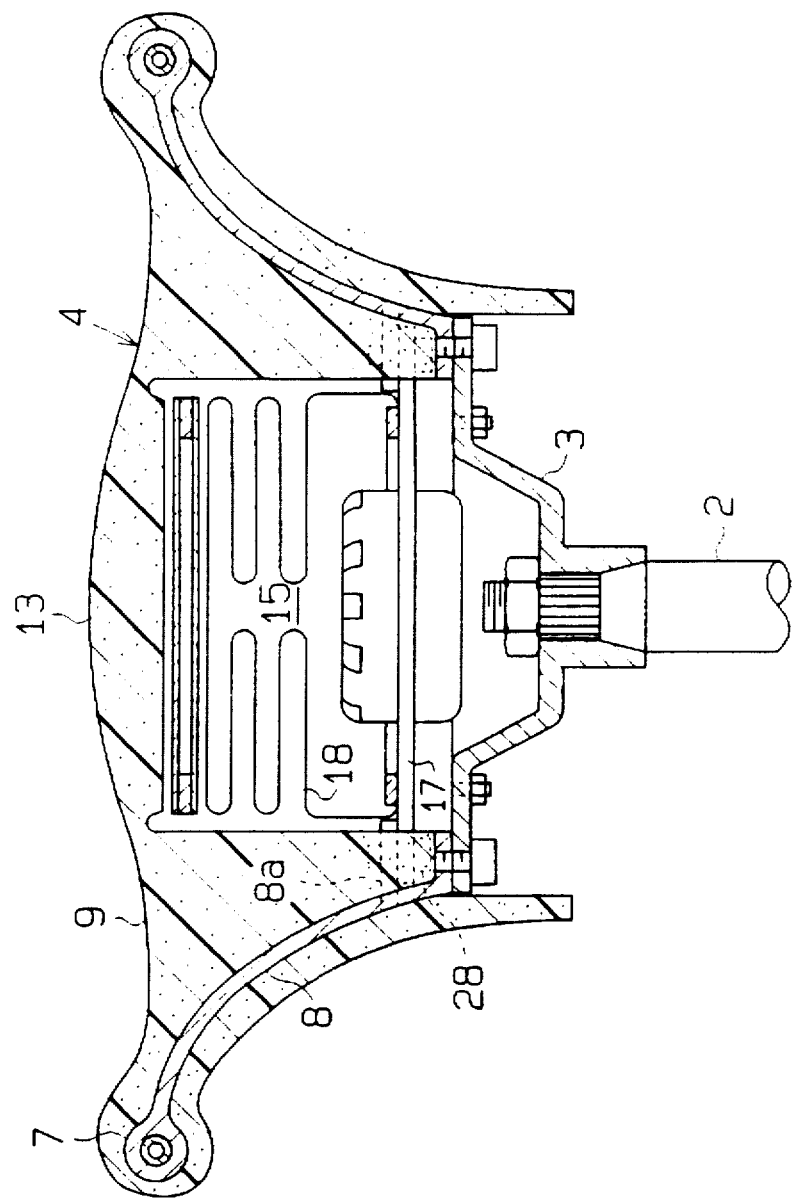
FIG. 9 is a cross-sectional view showing a modification of the second embodiment.
Figure 10:
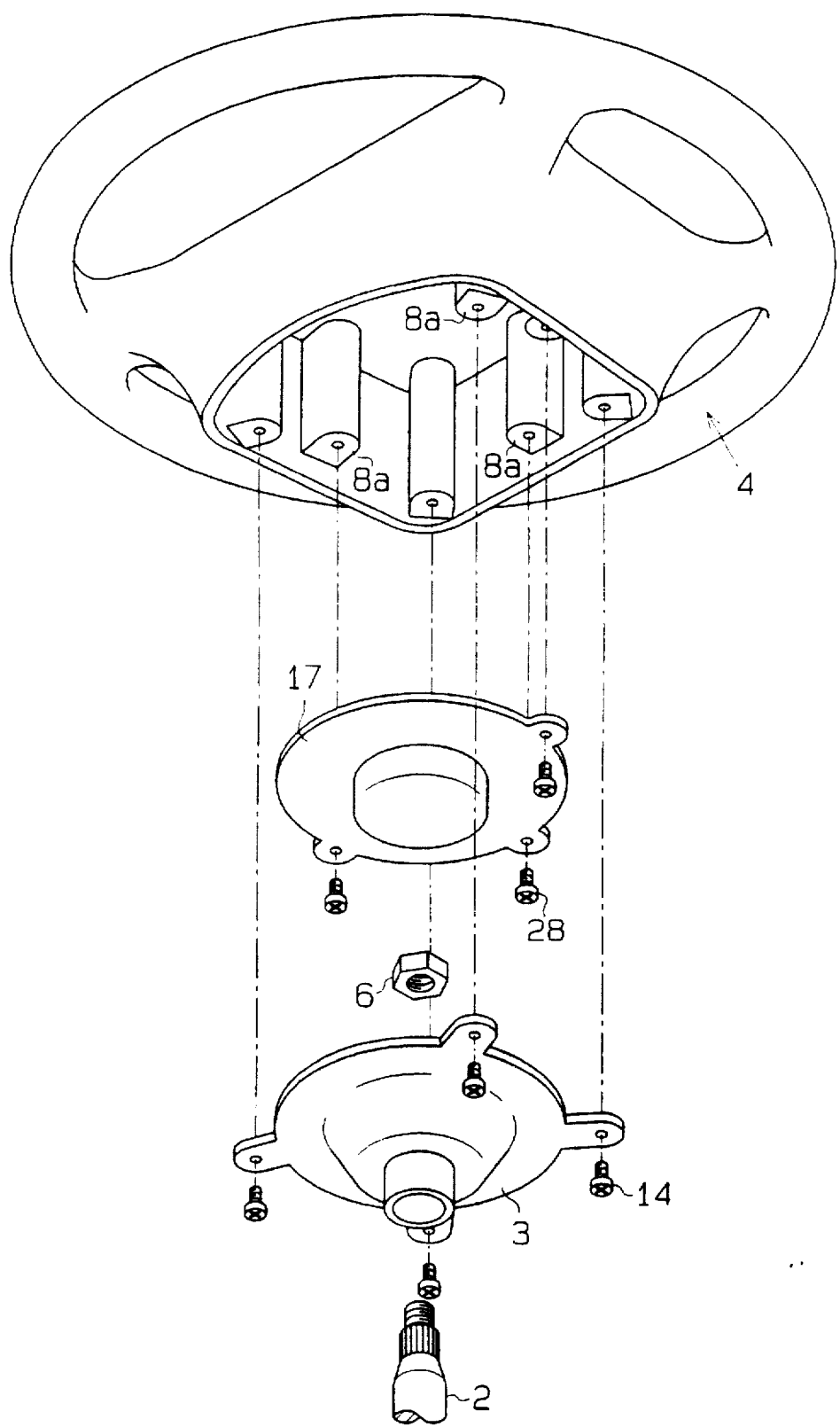
FIG. 10 is an exploded perspective view showing the steering wheel of FIG. 9 from below.

As shown in FIGS. 9 and 10, the bag holder 31 may be omitted. In other words, the air bag mechanism 15 may be constituted from the inflator 17 and the air bag 18 with the inflator 17 and the air bag 18 fastened directly to the spoke cores 8 (or the connectors 8a).

Figure 11:
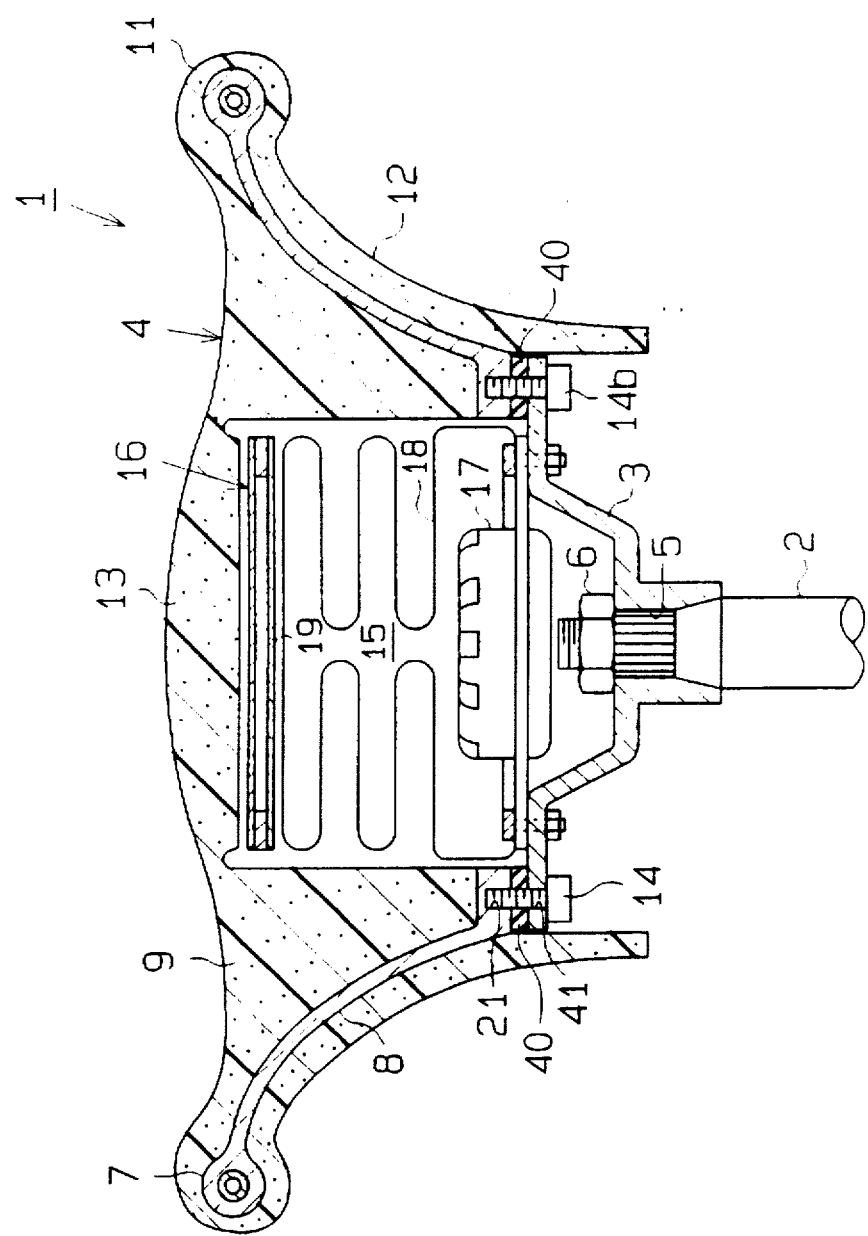
FIG. 11 is a cross-sectional view showing the mounting structure of a steering wheel assembly according to a third embodiment of the present invention.
Figure 12:
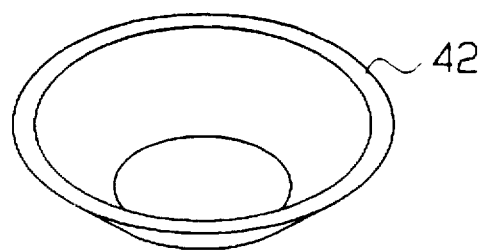
FIG. 12 is a perspective view showing a belleville spring that serves as a modified elastic member.
Figure 13:
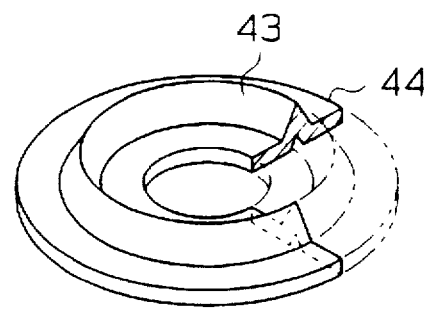
FIG. 13 is a perspective view showing a washer that serves as a modified elastic member.

A third embodiment of the present invention will hereafter be described with reference to FIGS. 11 to 13.

A rubber damper bushing 40 is provided between the boss plate 3 and the spoke cores 8. The bolts 14 extend through the bushing 40 and are tightened sufficiently by bolts 14 to squeeze bushing 40. When vibrations, such as those produced by the engine, are transmitted to the boss plate 3 through the steering shaft 2, the vibrations are absorbed by the damper bushing 40. This effectively prevents vibrations from being transmitted to the spoke cores 8 and the surface layer 9. As a result, this prevents uncomfortable vibrations when the driver grips the steering wheel 1.

Each bolt 14 extends through the damper bushing 40. Therefore, the vibrations of the bolts 14 are effectively absorbed by the bushing 40. This minimizes loosening of the bolts 14 that may be caused by vibrations. As a result, this structure further secures the boss plate 4 to the wheel body 14.

The damper bushing 40 also prevents chattering caused when space exists between the boss plate 3 and the spoke cores 8.

The damper bushing 40 has holes through which the bolts 14 are inserted. The diameter of the holes are preferably smaller than the outer diameter of the threaded rod of the bolts 14. The damper bushing 40 prevents each bolt 14 from falling out when fastening the boss plate 3 to the wheel body 4 even if the bolt 14 is temporarily not supported. This improves workability during assembly.

A material having predetermined elasticity and capable of absorbing vibrations such as those produced by the engine may be used to substitute the rubber damper bushing 40. For example, a belleville spring 42, for example constructed from spring steel, as illustrated in FIG. 12, or a washer 44 provided with a vibration absorber 43, as illustrated in FIG. 13, may be employed instead of the damper bushing 40.

The damper bushing 40 may also be provided at a position irrelevant to the bolts 14.

A fourth embodiment of the present invention will hereafter be described with reference to FIGS. 14 to 17.

Figure 16:
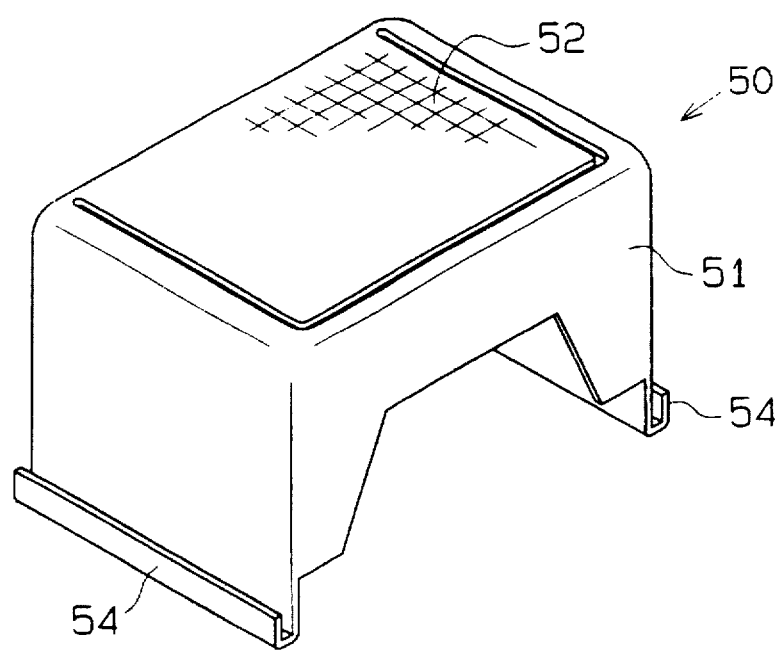
FIG. 16 is a perspective view showing the insert.

In this embodiment, a protector for protecting the air bag 18 is embedded in the surface layer 9 and the pad 13. More specifically, an insert 50 made of an elastomer (e.g., SEBS (styrene-ethylene-butadiene-ethylene)) or TPO (thermoplastic polyolefine, polyester elastomer) is embedded in the surface layer 9 and the pad 13. As shown in FIG. 16, the insert 50 includes a box-like frame 51, and a mesh 52 which is connected to the frame 51 by a suitable hinge connection. The insert 50 reinforces the surface layer 9 and prevents parts of the layer 9 and the pad 13 from being dispersed during inflation of the air bag 18.

Figure 17:
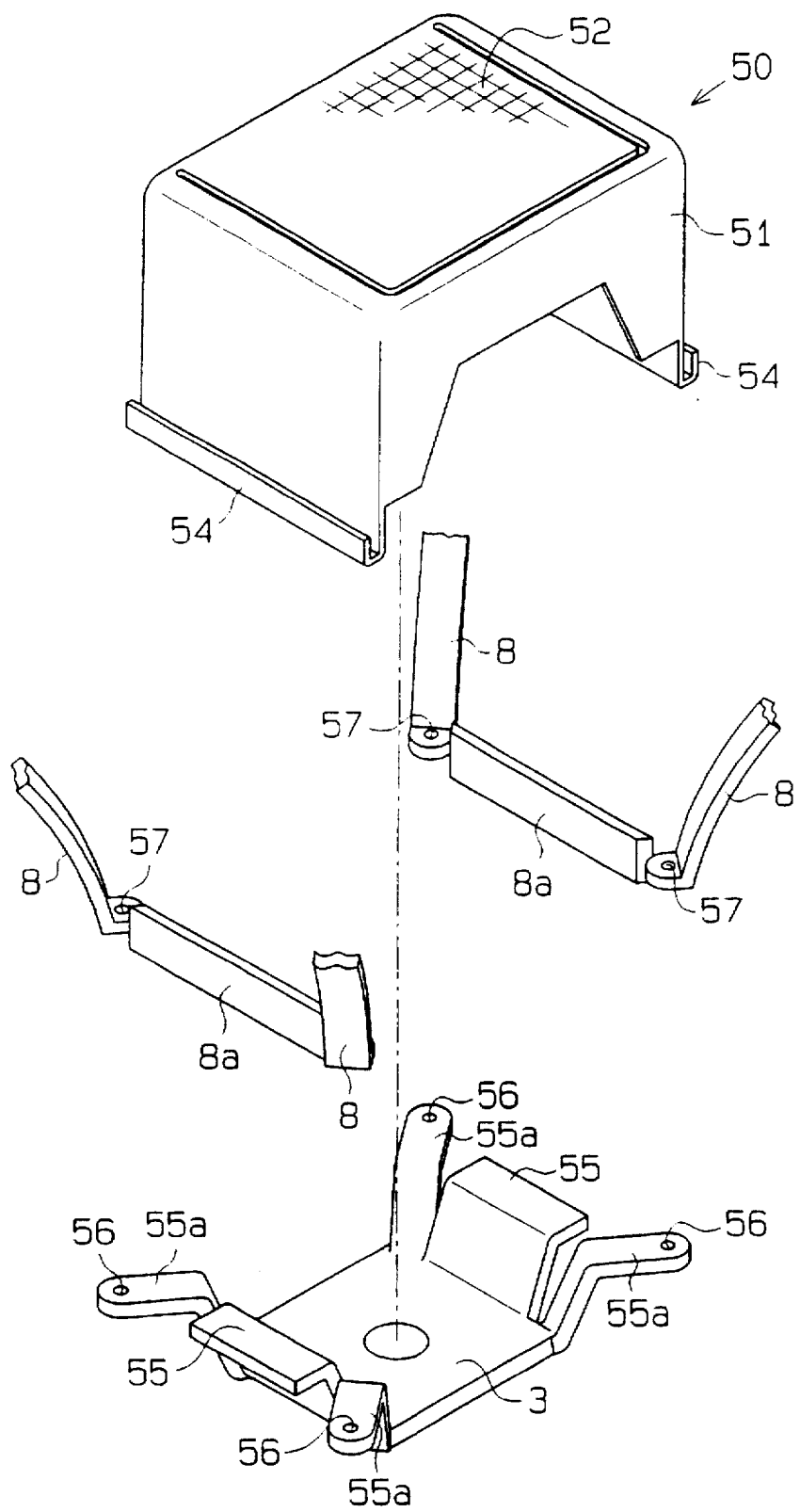
FIG. 17 is an exploded perspective view showing the insert, spoke cores, and boss plate.

In a manner similar to the above embodiments, each connector 8a connects the distal end of adjacent spoke cores 8, as illustrated in FIG. 17. As shown in FIG. 16, both sides of the frame 51 are bent upwardly to define a hook 54 on each side. The spoke cores 8 are retained by the insert 50 by hooking the connectors 8a to the associated hook 54. As shown in FIG. 17, projected sections 55, each of which extend toward the associated hook 54, are defined on the boss plate 3. The inner side of each hook 54 is clamped between the associated projected section 55 and connector 8a. Although each hook 54 is illustrated as extending continuously on the lateral sides of the insert 50 in the drawings, each hook 54 may be defined by a plurality of hook sections with equal intervals between each section.

In this embodiment, each hook 54 of the insert 50 is engaged with the associated connector 8a of the spoke cores 8. This structure prevents the insert 50 from being forced out of the surface layer 9 and the pad 13 when stress is applied to the insert 50 during inflation of the air bag 18. Thus, displacement of the insert 50 is prevented.

The inner side of each hook 54 is clamped between the connector 8a and the projected section 55 of the boss plate 3. This structure further secures the insert 50 to the spoke cores 8 and the boss plate 3 and further ensures prevention of the displacement of the insert 50. As a result, the inflation of the air bag 18 is performed in a sufficient and stable manner.

In this embodiment, the connectors 8a connect adjacent spoke cores 8 and support the insert 50. This structure enables stress to be applied to the plurality of spoke cores 8 during inflation of the air bag 18. The distribution of the stress enables the inflation of the air bag 18 to be performed in a further sufficient and stable manner.

Figure 14:
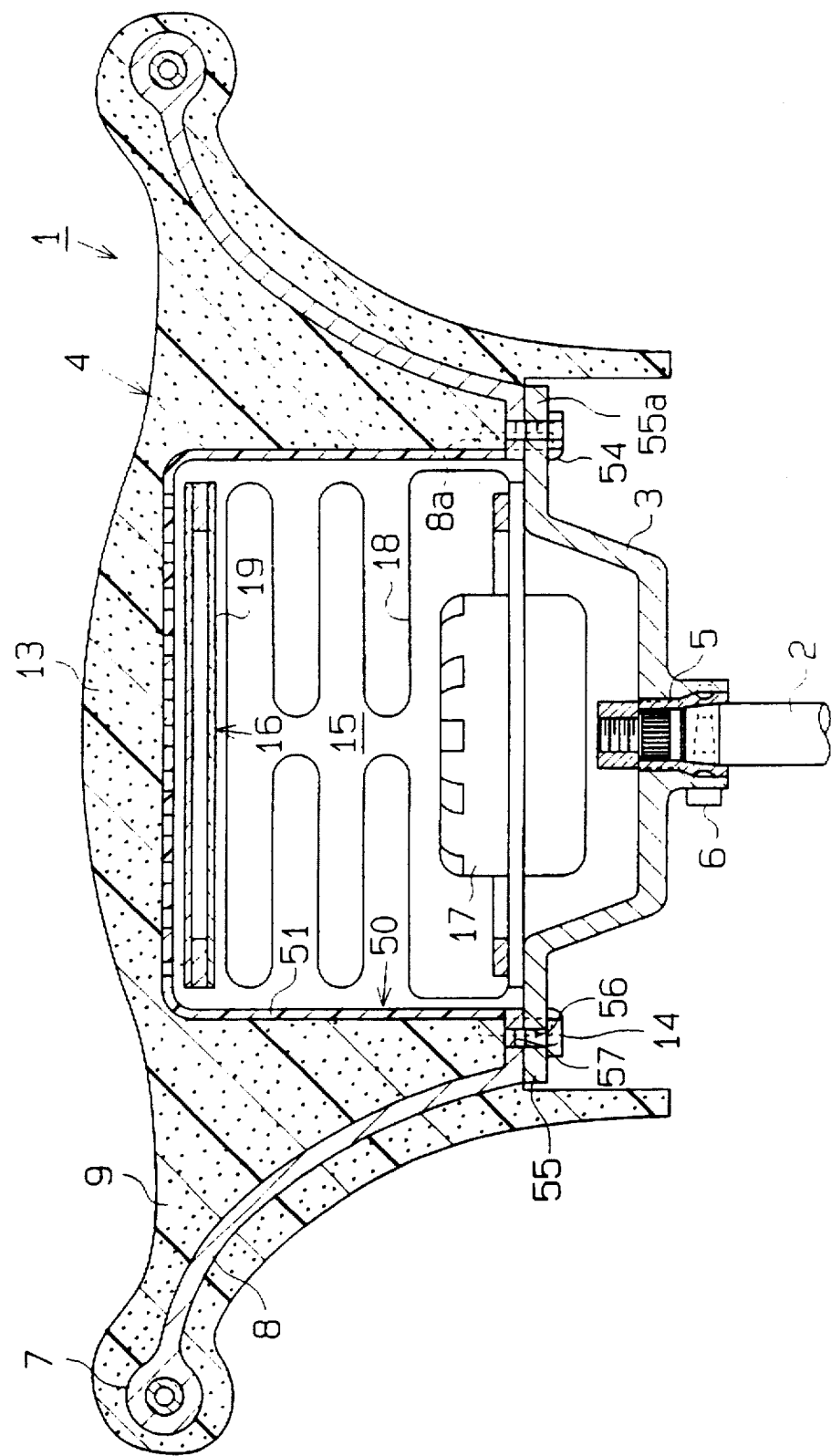
FIG. 14 is a cross-sectional view showing the mounting structure of a steering wheel assembly according to a fourth embodiment of the present invention.
Figure 15:
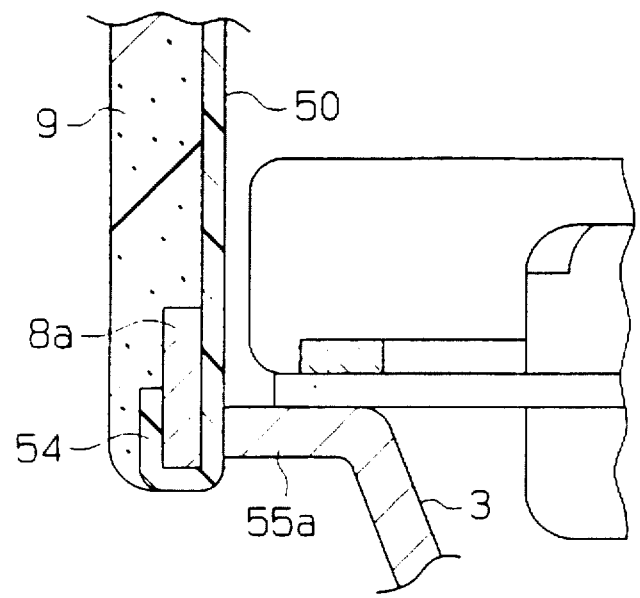
FIG. 15 is an enlarged cross-sectional view showing the engagement between an insert and a core.

A pair of attaching plates 55a are provided on each lateral side of the boss plate 3 with a projected section 55 located therebetween. Each attaching plate 55a extends diagonally in an upward direction and is bent horizontally near its distal end. A bolt hole 56 is provided in the horizontal section of each plate 55a. Each bolt hole 56 corresponds to a threaded hole 57, which is provided in a horizontal section defined at the lower end of each spoke core 8. As shown in FIG. 14, the boss plate 3 is fixed to the wheel body 4 by inserting the bolt 14 into each aligned pair of holes 56, 57 and tightening the bolt 14.

The structure of the insert 50 is not limited to the box-like frame 51 and the mesh 52. For example, the frame 51 may have a netlike surface similar to the mesh 52.

Figure 18:
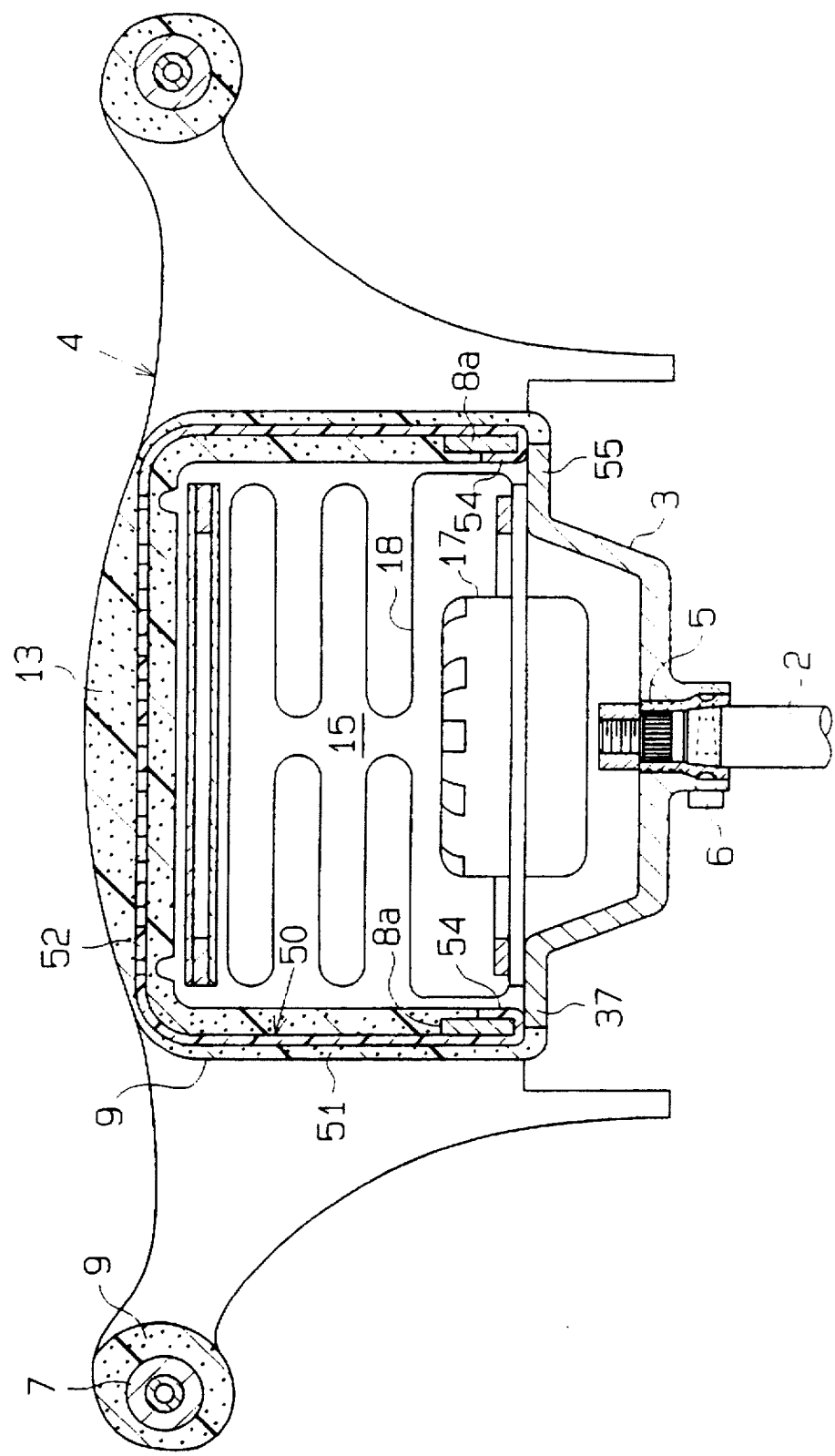
FIG. 18 is a cross-sectional view showing a modification of the fourth embodiment.
Figure 19:
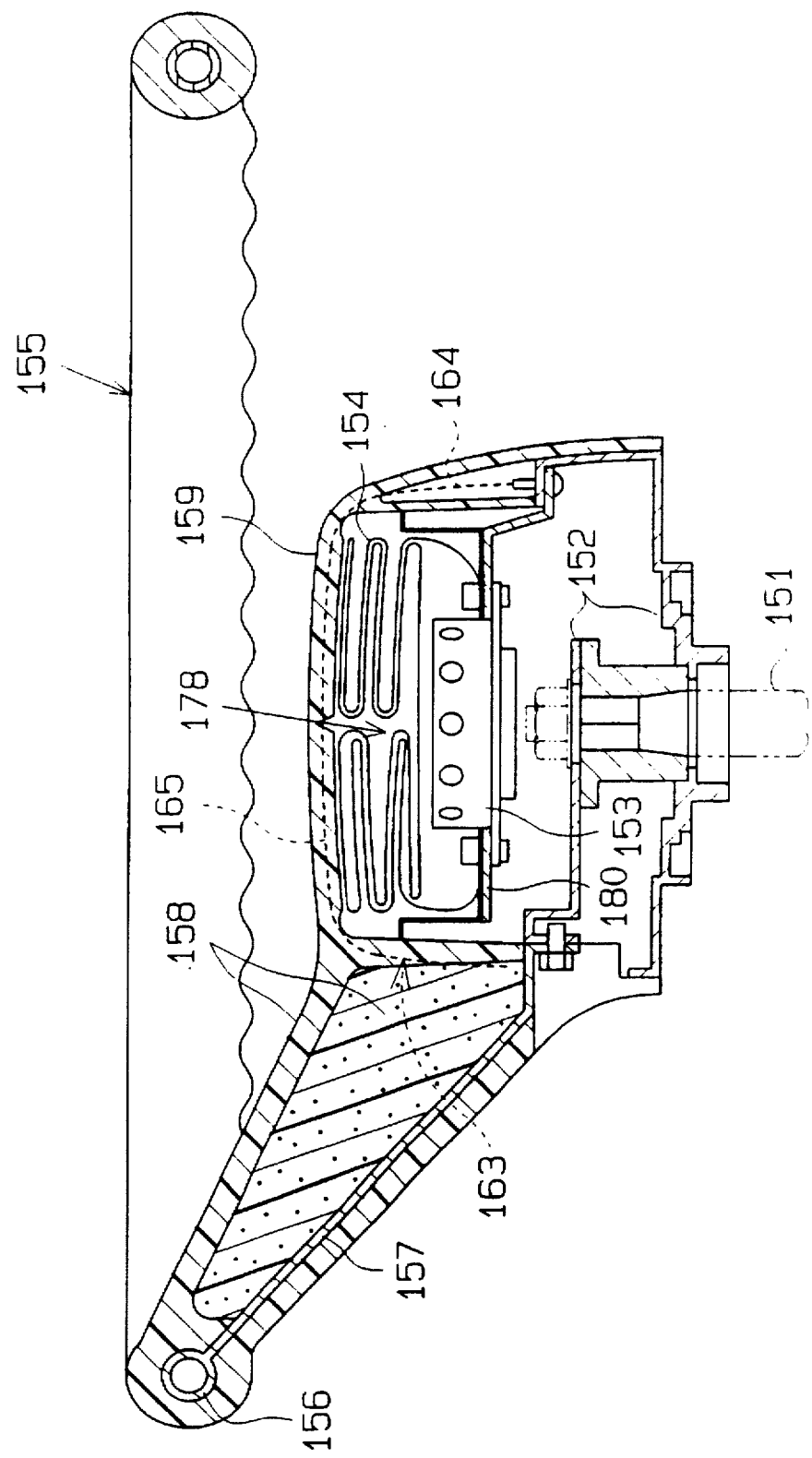
FIG. 19 is a cross-sectional view showing a prior art steering wheel assembly.
Figure 20:
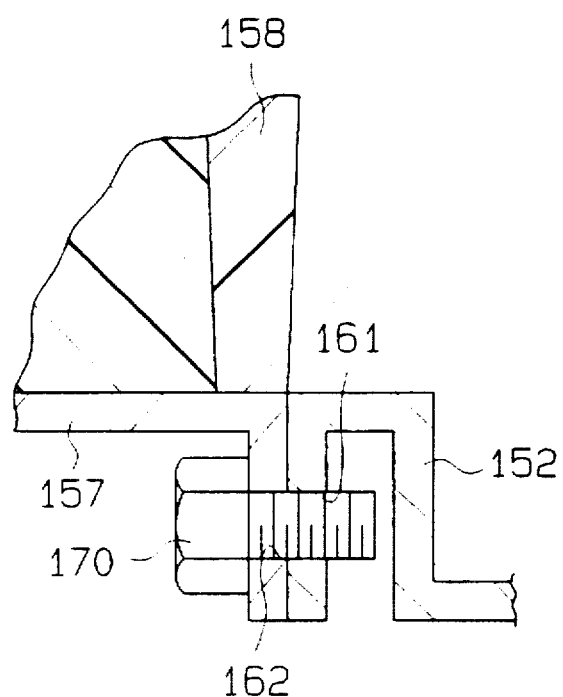
FIG. 20 is a partially enlarged cross-sectional view showing the steering wheel of FIG. 19.

A modification of the fourth embodiment is illustrated in FIG. 18. Each hook 54 provided on the insert 50 is clamped between the associated projecting section 55, located below the hook 54, and the associated connector 8a, located above the hook 54. This structure enables the same merits of the fourth embodiment to be obtained.

Although only four embodiments of the present invention have been described herein, it should be apparent to those skilled in the art that the present invention may be embodied in many other specific forms without departing from the spirit or scope of the invention. For example, the present invention may be modified, for example, as described below.

(1) Bolts which are used as fasteners may be substituted by screws, rivets, or the like.

(2) The membrane switch employed in the horn switch mechanism 18 may be substituted by other conventional switch devices.

(3) In the above embodiments, the boss plate 3 is mounted to the distal end of the steering shaft by using an adaptor 5 and a bolt 6. However, instead of this structure, serrations may be formed in the surface of a shaft inserting hole defined in the boss plate 3 and corresponding serrations may be formed on the distal end of the steering shaft 2. In this case, the distal end of the shaft 2 is fit into the inserting hole of the boss plate 3. A nut 6 is then used to tighten the boss plate 3 to the shaft 2.

(4) When mounting the boss plate 3 to the steering shaft 2, the boss plate 3 may be fixed integrally to the wheel body 4 beforehand. The boss plate 3 may be mounted on the steering shaft 2 in this state using fasteners.

(5) The number of spoke cores 8 may be arbitrarily changed.

Therefore, the present examples and embodiments are to be considered as illustrative and not restrictive and the invention is not to be limited to the details given herein, but may be modified within the scope of the appended claims.

What is claimed is:

1. A steering wheel assembly comprising a wheel body, a ring, a pad located in a center section of said ring, a plurality of spaced apart spokes coupling between said ring and said pad, a covering material secured to said ring, said pad and said plurality of spokes to form a continuous surface layer thereacross, a spoke core included in each one of said plurality of spokes, a connector portion interconnecting together adjacent spoke cores and a mounting device attached to said connector portion and connecting said wheel body to a steering shaft, said mounting device including an insert embedded in said pad, said insert having a lowermost portion engageable with said connector portion to immovably fix said insert, and said lowermost portion has a hook for receiving said connector portion.

2. The steering wheel assembly as in claim 1 wherein said mounting device includes an air bag mechanism.

3. The steering wheel as set forth in claim 1 further comprising a resilient member interposed between said connector portion and said mounting device.

4. The steering wheel as set forth in claim 3, wherein said resilient member comprises one from the group consisting of a resilient rubber, a belleville spring and a washer.

5. The steering wheel as set forth in claim 2 further comprising:

a support piece provided with said connector portion; and said air bag mechanism being securely coupled to the support piece.

6. The steering wheel as set forth in claim 5 wherein:

said mounting device further includes a bag holder supporting said air bag mechanism; and said bag holder being securely coupled to said support piece.

7. A steering wheel assembly comprising a wheel body which has a ring core and a plurality of spoke cores, said ring cores and said plurality of spoke cores being covered by synthetic resin which forms a continuous surface layer on the ring core, the plurality of spoke cores and a pad, said wheel body having an opening on a side opposed to the surface layer of the pad to accommodate an insert embedded in the pad and an air bag mechanism, wherein said wheel body is securely coupled to a steering shaft by way of a boss plate which closes the opening;

a connector portion interconnecting adjacent ones of said plurality of spoke cores to each other;

said connector portion including a first connecting hole;

said boss plate having a second connecting hole that is registry with the first connecting hole when said connector portion is positioned on said boss plate; and a fastening member inserted into the first and the second connecting holes which are in alignment with each other to securely couple said boss plate to said connector portion.

8. The steering wheel as set forth in claim 7 further comprising:

a rib provided on said connector portion;

said rib having a positioning recess;

a bracket provided on said boss plate in association with said rib; and a positioning projection provided on said bracket in association with said positioning recess.

9. The steering wheel as set forth in claim 8 further comprising:

a first bent portion provided on said rub;

a second bent portion provided on said bracket in association with said first bent portion with said first bent portion and said second bent portion being in surface contact with each other.

10. The steering wheel as set forth in claim 9 further comprising a resilient member interposed between said connector portion and said boss plate, said resilient member comprising one from the group consisting of a resilient rubber, a belleville spring and a washer.

11. The steering wheel as set forth in claim 7 further comprising:

a support piece provided with said connector portion; and said air bag mechanism being securely coupled to said support piece.

12. The steering wheel as set forth in claim 11 further including a bag holder for supporting said air bag mechanism and wherein said bag holder is securely coupled to said support piece.

13. The steering wheel as set forth in claim 7 wherein said insert has a hook-shaped lowermost portion for receiving the connector portion to immovably fix said insert.

14. A steering wheel assembly comprising a wheel body, a ring, a pad located in a center section of said ring, a plurality of spaced apart spokes coupling between said ring and said pad, a covering material secured to said ring, said pad and said plurality of spokes to form a continuous surface layer thereacross, a spoke core included in each one of said plurality of spokes, a connector portion interconnecting together adjacent spoke cores and a mounting device attached to said connector portion and connecting said wheel body to a steering shaft, said mounting device including a boss plate, said boss plate and said connector portion, respectively, each have holes therein that align when mounted together, a fastening member inserted into such aligned holes to securely couple said boss plate to said connector portion;

said positioning means including:

a rib provided on said connector portion;

said rib having a positioning recess formed therein;

a bracket provided on said boss plate in association with said rib; and a positioning projection provided on said bracket in association with said positioning recess.

15. The steering wheel as set forth in claim 14 further comprising means for suppressing an offset between said boss plate and said connector portion when said boss plate is coupled to said connector portion.

16. The steering wheel as set forth in claim 15, wherein said suppressing means includes:

a first bent portion provided on said rib;

a second bent portion provided on said bracket in association with said first bent portion with said first bent portion and said second bent portion being in surface contact with each other.

17. The steering wheel as set forth in claim 14 wherein:

said continuous surface layer includes a through hole aligned with and communicating with the hole of said connector portion, said through hole having an inner surface;

said inner surface having a bore; and a pin-like portion provided with said fastening member, said pin-like portion being arranged to be received in said bore when said fastening member is inserted into the through hole.

* * * * *